United States Patent Office 3,365,028
Patented Jan. 23, 1968

3,365,028
SPOT-TYPE DISC BRAKE
Heinrich Alwin Hajek, Horbranz, Vorarlberg, Austria, assignor to Allbau Entwicklungs G.m.b.H. u. Co., Lindau (Bodensee), Germany, a firm of Germany
Filed Sept. 10, 1965, Ser. No. 486,473
7 Claims. (Cl. 188—73)

ABSTRACT OF THE DISCLOSURE

A disc brake with the brake unit supported by resilient means on a stationary support with the brake unit slidable on the resilient means and pivotable relative to the support.

Specification

This invention relates to brakes of the disc type wherein a plurality of braking surfaces engage the rotating disc on opposite sides thereof. Brakes of the general type herein disclosed have been used in conjunction with heavy vehicles where increased braking power is mandatory.

The specific invention disclosed herein is directed to a disc brake wherein means are provided for the automatic adjustment and alignment of the braking surfaces with the brake disc thereby to enhance the life of the brake pads. A known type of brake design employs a disc which is secured at its outer periphery to a hub with primary and secondary brake pads mounted on a common support which extends through the center of the disc. In this type of brake, the mounting of the brake pads is of considerable importance in that it is necessary to insure that the pads are properly aligned with the rotating disc so as to engage the disc over its full periphery and thereby obtain good wear characteristics. Failure to provide the proper mount for the brake pads may result in the uneven wear of the pads with a consequent reduction in braking force and, in an extreme case, may cause a complete failure of the brake.

It is a primary object of this invention to provide a disc brake that is self-adjusting and self-aligning.

It is a more specific object of this invention to provide a disc brake wherein the brake pads are movable toward and away from the plane of the rotating disc and the brake unit is supported both for slidable and pivoting movement toward and away from the brake disc.

Still more specifically, the primary objects of this invention are embodied in a brake wherein there is a rotating disc and a brake unit mounted on a stationary support. The brake unit includes brake lining pads disposed on opposite sides of the rotating disc with each pad carried by backing plates and being movable relative to each other into engagement with the disc. Each of the backing plates is supported on a brake unit base. The brake unit base is supported by resilient means for both sliding and pivoting movement relative to the stationary support. This resilient means may take the form of rod-like members composed of a resilient composition with the composition rods being disposed in grooves formed in the stationary support and the brake support base. An alternative means is the use of resiliently biased detents which engage grooves in the brake unit so that the brake unit is supported by the detents both for sliding movement and pivoting movement.

Other objects and aspects of the invention will become more apparent upon a complete perusal of the specification.

Figure 1:
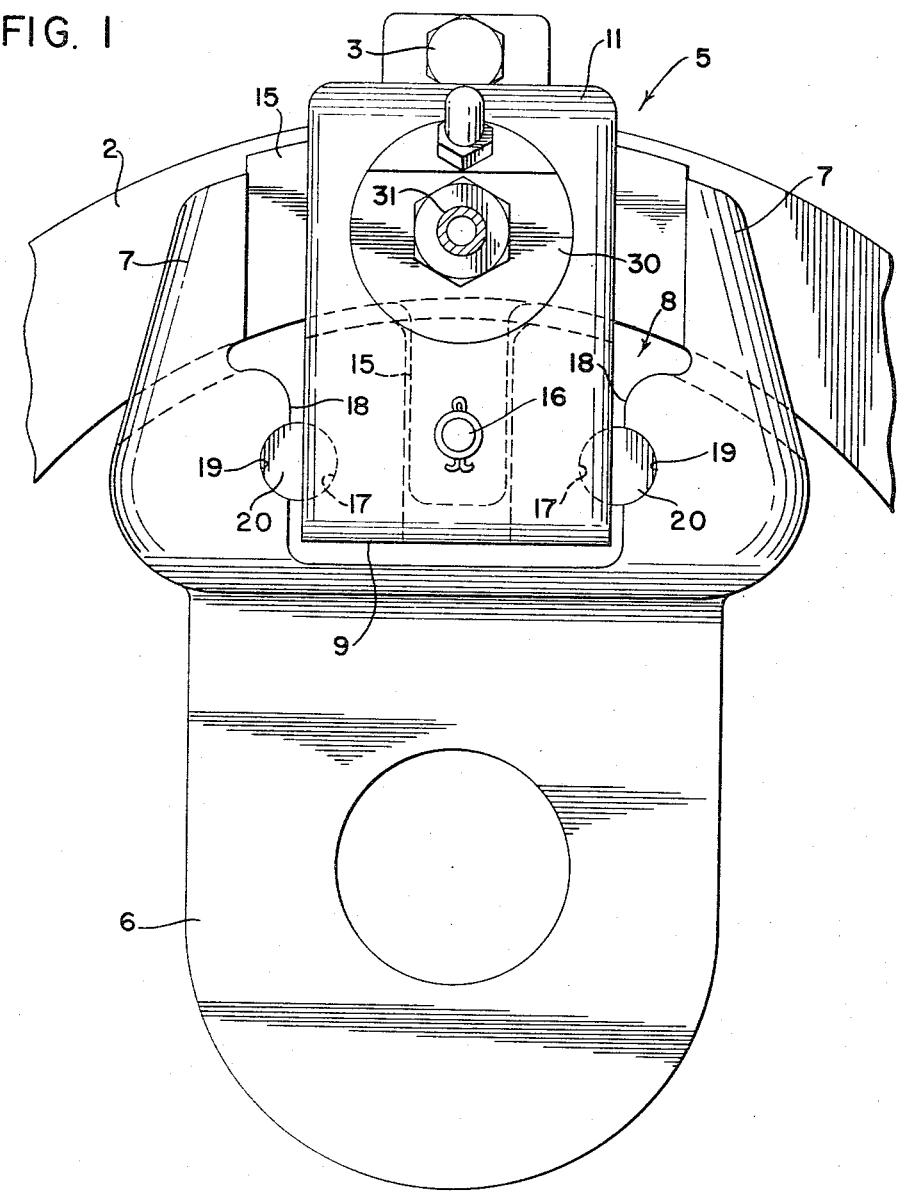
Figure 2:
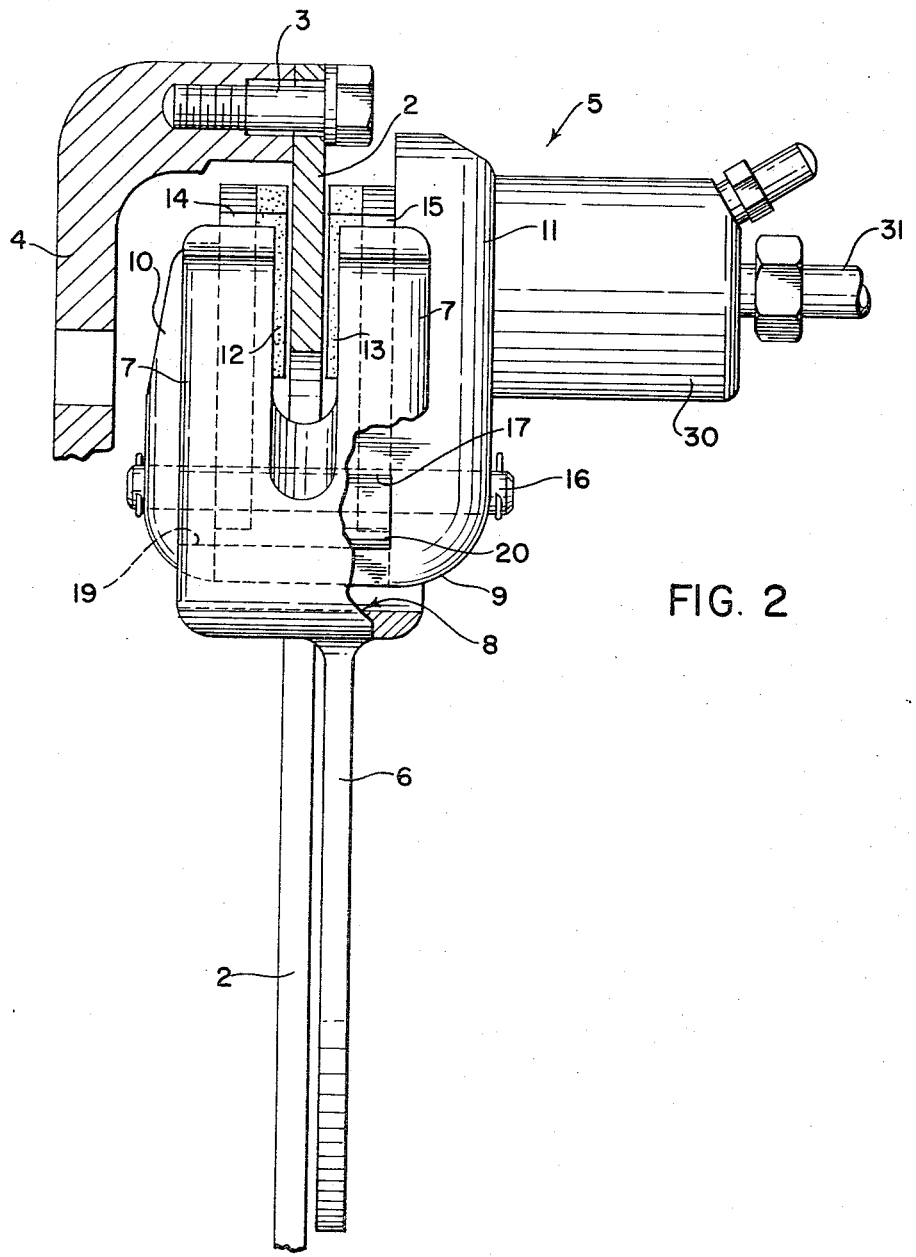
Figure 3:
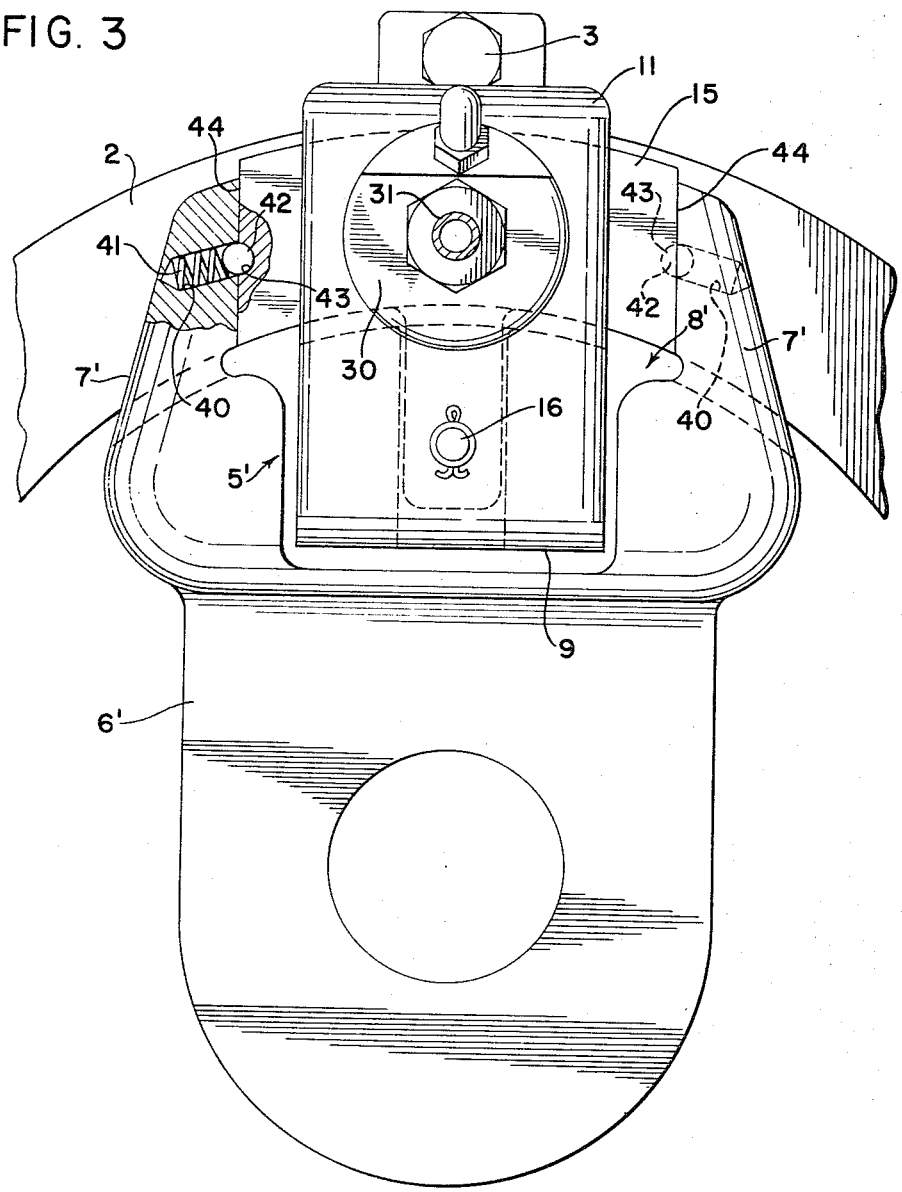
Figure 4:
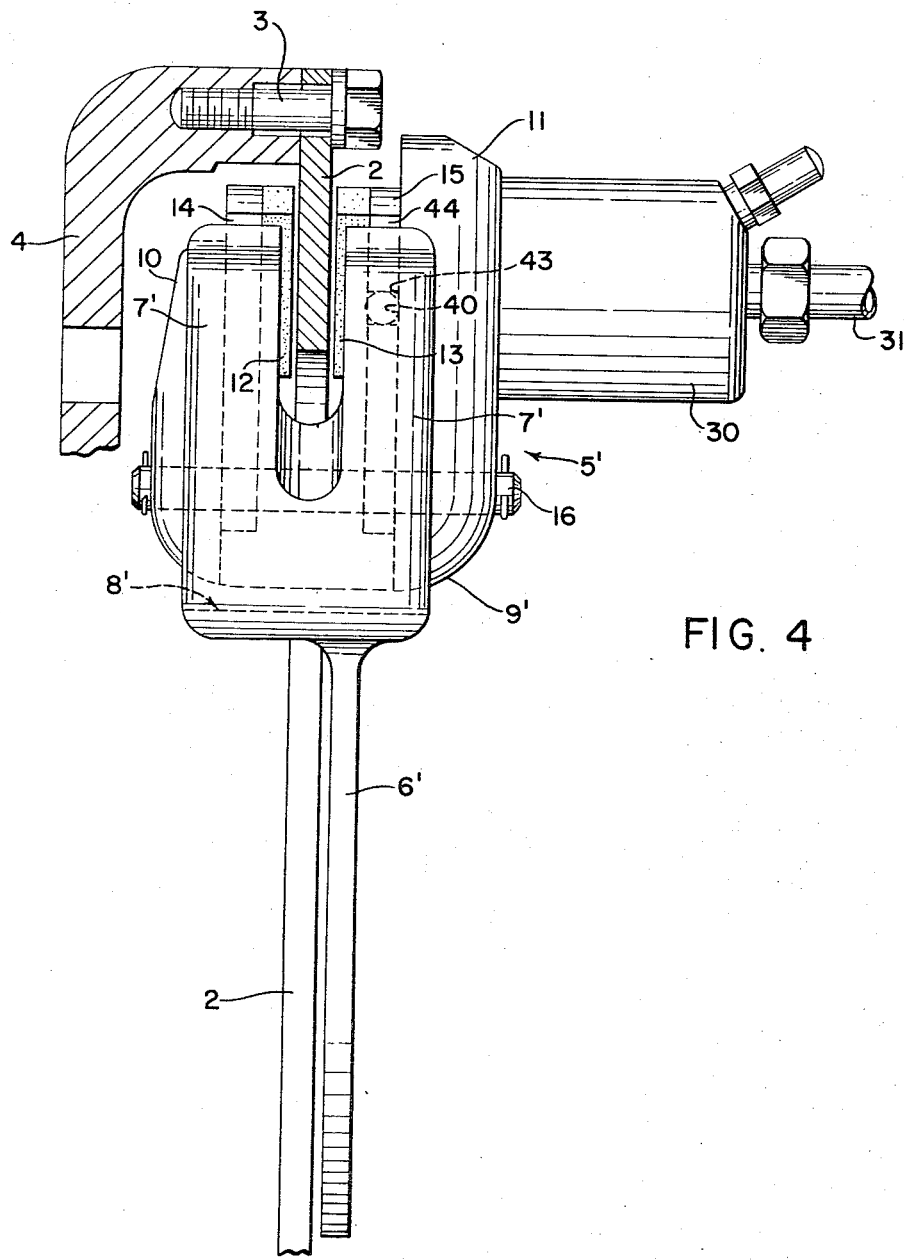

In the drawings:
FIG. 1 is an end elevation view showing a portion of the brake disc and the brake unit;
FIG. 2 is a section view showing the embodiment of the brake in the disengaged position;
FIG. 3 is a view similar to FIG. 1 showing in end elevation an alternative embodiment;
FIG. 4 is a section view of the embodiment illustrated in FIG. 3 and showing the brake in the disengaged position.

Referring to the drawings, FIGS. 1 and 2 illustrate one embodiment of the invention. This embodiment contemplates a rotatable shaft, not shown, to which there is secured a hub 4. At the outer periphery of the hub 4 a ring disc 2 is secured by bolts 3 in a position axially spaced from the hub 4. A brake unit, indicated generally by the numeral 5, is supported on a stationary support 6.

The stationary support 6 comprises a yoke which is bifurcated both transversely and longitudinally to provide upstanding arms 7 on opposed sides of the disc 2. The bifurcated arms 7 define between them a central recess 8 in which the brake unit 5 is received.

The brake unit comprises a support yoke or base 9 which has upstanding spaced apart arms 10, 11. As shown in FIG. 2, the base 9 is adapted to be received in the recess 8 in the stationary support 6 with the disc 2 extending inwardly between the arms 10 and 11. Opposed friction pads 12, 13 are mounted on generally T-shaped backing plates 14, 15 respectively which are disposed on opposite sides of disc 2. The arms 10, 11 as well as the backing plates 14, 15 have an aperture therethrough in which is received a carrier bolt 16. This bolt provides a support on which the plates 14, 15 may slide relative to the base 9. The upstanding arms 7 cooperate with the plates 14, 15 to provide a guiding support therefor during this sliding movement.

The base 9 further includes grooves 17 which are formed on opposed sides thereof. These grooves, as best viewed in FIG. 1, are semicylindrical in configuration. Corresponding grooves 19 are formed on the surfaces 18 of the recess 8 in the stationary support 6.

Adapted to be received in the grooves 17 and 19 are rod-like members 20 which are cylindrical in form. The rod-like members are fabricated from a strong yet resilient material and may be of any desirable length. Since the rod-like members support the brake unit 5 on the support 6, they must be of sufficient length to provide an adequate supporting surface for the unit. The length of the grooves 17 are less than the width of the base member 9 and approximately the same length as rods 20 so that the rod-like members are restrained from longitudinal sliding movement in the grooves 17. It is believed readily apparent that with the rod-like members 20 in the assembled relationship illustrated in FIG. 1, the brake unit 5 may slide relative to the stationary support through sliding movement of the rod-like members 20 along the grooves 19.

As an actuator for the brake unit, a fluid pressure cylinder 30 is secured to the arm 11 of the base 9. The arm 11 includes a cylindrical opening through which a piston, not shown, is adapted to pass and abut the backing plate 15. The action of the piston is controlled by the introduction of fluid through the conduits 31.

In operation, assuming rotation of the disc 2, hydraulic fluid is introduced through the conduits 31 into the cylinder 30 thereby causing the piston to pass through the opening in the arm 11 and abut the backing plate 15. Further fluid pressure causes the piston to move the plate 15 and its attendant friction pad 13 along bolt 16 in the direction of the disc 2 until the pad has frictionally engaged the surface of the disc. Further pressure exerted by the cylinder is ineffective to further move the backing plate 15. As a result, the fluid cylinder, the base 9 and the backing plate 14 slide with rods 20 along the grooves 19 until the friction pad 12 engages the opposite surface of the ring disc 2. In this manner, the disc 2 is sequentially gripped by both friction pads 12, 13.

In view of the loose fit between the carrier bolts 16 and the apertures in the backing plates 14 and 15, it is practically impossible for the individual parts of the brake to bind. Also, because of this loose fit, it is possible for the backing plates 14, 15 to effect a slight independent pivoting movement relative to each other. This again will assist in the proper frictional contact of the brake pads against the ring disc. Finally, in view of the resilient composition material comprising the rod-like members 20, the brake unit 5 may impose a torsional force on the rods 20 which will permit some tilting movement of the brake unit relative to the stationary support 6. This tilting movement is accommodated by deformation of the rod-like members 20 and thereby provides further compensation for alignment of the pads against the surface of the disc.

It should be understood that the precise arrangement of the rod-like members 20 may be varied. Thus, as an example, it is possible for the members 20 to be carried by the support 6 with the sliding groove being formed in the base 9 so that the brake unit would slide on the rods 20. The same potential for pivoting or tilting movement of the brake unit through deformation of rods 20 would be present in this arrangement.

An alternative embodiment is illustrated in FIGS. 3 and 4 wherein the stationary support 6' and the brake unit 5' have the same basic configuration and components as the embodiment of FIG. 1. However, in lieu of the rod-like members 20, this embodiment employs a detent mechanism which is illustrated in FIG. 3. This detent mechanism comprises bores 40 formed in two opposed arms 7' of the stationary support 6'. These bores are formed parallel to the plane of disc 2. In each of these bores there is disposed a spring 41 and a ball detent 42. The bias of the spring 41 urges the ball detent 42 toward the central recess 8' in the stationary support.

A groove 43 is formed in each side surface 44 of the backing plate 15 associated with the arms 7' having the bores. Each groove extends transverse of the plate 15 and has a length in excess of the diameter of the ball detents 42 so that a sliding movement of the plate 15 relative to the detents is permissible. It is contemplated that the design of the backing plate 15 may be varied if a groove greater in extent than the width of the backing plate is required as, for example, by providing ears on the opposed ends of the backing plate thereby to provide additional material in which to form the groove. Moreover, the groove may be formed in the other of the backing plates and the position of the detents varied accordingly.

It is apparent that with the above described arrangement, the brake unit 5 is supported on opposite sides by the balls 42. Upon actuation of the hydraulic cylinder 30, the plate 15 may slide relative to the balls while the balls continue to support the brake unit. In addition, the brake unit may pivot about the balls 42 thereby to further compensate for deformations or irregularities in the ring disc 2.

Although the present invention has been described in connection with but a few illustrated embodiments, variations and modifications may be resorted to by those skilled in the art without departing from the principles of the invention. All of these variations and modifications are considered to be within the true scope and spirit of the present invention as disclosed in the foregoing description and defined by the appended claims.

I claim:
1. In a disc brake, the combination comprising:
a rotatable disc,
a stationary member,
a brake unit comprising spaced apart primary and secondary braking elements adapted to engage opposite sides of said disc,
said braking unit including groove means formed thereon with said groove means extending transverse of the plane of said disc, and
resilient supporting means on said stationary member; a portion of said resilient means being received in said grooves formed in said braking unit and supporting said braking unit on said stationary member vertically spaced from engagement with said stationary member, with said resilient means being the sole vertical support for said brake unit and supporting said brake unit for sliding movement on said member and pivoting movement relative to said resilient means.

2. The combination of claim 1 wherein said stationary member includes recesses formed therein adjacent said groove means in said brake unit with said resilient means supported in said recesses.

3. The combination of claim 1, wherein said resilient means comprises elongated rod means of a resilient material supported on said stationary member and extending transverse of the plane of said disc.

4. The combination of claim 1 wherein said resilient means comprises spring biased ball detent means carried by said stationary member with said detent means biased into said groove means.

5. The combination of claim 2 wherein said resilient means comprises spring biased ball detents received in said recesses formed in said stationary member,
recess means formed in said brake unit with said ball detents being resiliently biased into said recess means.

6. The combination of claim 4 wherein said groove means is formed in one of said braking elements.

7. In a disc brake, the combination comprising:
a rotatable disc,
a stationary member,
a brake unit including a base,
primary and secondary braking elements on said base,
said stationary member comprising spaced apart upstanding bifurcated arms defining a central recess therebetween,
said brake unit being received in said recess with said primary and secondary braking elements on opposite sides of said disc,
groove means formed in opposite walls of said recess with said grooves extending transverse to said disc,
groove means formed in opposite sides of said base with each of said groove means being substantially parallel to and adjacent to one of said first-mentioned groove means, support rods on opposite sides of said base with each rod having portions thereof received in the groove means in said base and said recess thereby providing the sole vertical support supporting said brake unit on said stationary member with said brake unit vertically spaced from engagement with said stationary member, each of said support rods being slidable in one of said grooves in said base and recess and fixedly restrained in the other of said grooves, said rods being composed of a resilient material whereby said brake unit may pivot relative to said stationary member by deforming said rods.

References Cited

UNITED STATES PATENTS

| | | | |
|---|---|---|---|
| 2,784,811 | 3/1957 | Butler | 188—23 |
| 2,915,147 | 12/1959 | Davis | 188—73 |
| 3,182,755 | 5/1959 | Campganolo | 188—73 |
| 3,260,332 | 7/1966 | Wells | 188—73 |
| 3,265,160 | 8/1966 | Elberg et al. | 188—73 |
| 3,213,969 | 10/1965 | Rosanowski et al. | 188—73 |

FOREIGN PATENTS 994,827   6/1965   Great Britain.

MILTON BUCHLER, *Primary Examiner.*

G. E. A. HALVOSA, *Assistant Examiner.*